US007378952B2

(12) United States Patent
Pumpelly et al.

(10) Patent No.: US 7,378,952 B2
(45) Date of Patent: May 27, 2008

(54) SYSTEMS AND DEVICES FOR BROADBAND COMMUNICATION WITH AN ALARM PANEL

(75) Inventors: John Albert Pumpelly, Marietta, GA (US); James Keith Reed, Marietta, GA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 206 days.

(21) Appl. No.: 11/316,757

(22) Filed: Dec. 23, 2005

(65) Prior Publication Data

US 2007/0146128 A1 Jun. 28, 2007

(51) Int. Cl.

| | |
|---|---|
| ***G08B 1/08*** | (2006.01) |
| ***G08B 29/00*** | (2006.01) |
| ***H04M 11/04*** | (2006.01) |
| *G05B 11/01* | (2006.01) |

(52) U.S. Cl. ................. 340/538; 340/531; 340/538.15; 340/538.17; 340/310.16; 379/37

(58) Field of Classification Search ................. 340/538
See application file for complete search history.

(56) References Cited

U.S. PATENT DOCUMENTS

| | | | | |
|---|---|---|---|---|
| 6,441,723 | B1 * | 8/2002 | Mansfield et al. | 340/538.11 |
| 6,453,687 | B2 * | 9/2002 | Sharood et al. | 62/127 |
| 7,091,831 | B2 * | 8/2006 | Crenshaw et al. | 340/310.17 |
| 2004/0125819 | A1 | 7/2004 | Binder | 370/463 |
| 2004/0160309 | A1 * | 8/2004 | Stilp | 340/10.2 |

* cited by examiner

*Primary Examiner*—Donnie L Crosland
(74) *Attorney, Agent, or Firm*—Cantor Colburn LLP

(57) ABSTRACT

A communications system for an alarm panel including: an alarm panel adaptor in operable communication with the alarm panel generating analog alarm signals; a first power-line communications device in operable communication with a the alarm panel adaptor converting the analog alarm signals to powerline alarm signals; a second powerline communications device receiving the powerline alarm signals over an electrical grid and converting the powerline alarm signals to internet protocol alarm signals; and a broadband connection in operable communication with the second powerline communications device for transmitting the internet protocol alarm signals to a remote central control station.

20 Claims, 3 Drawing Sheets

SYSTEMS AND DEVICES FOR BROADBAND COMMUNICATION WITH AN ALARM PANEL

BACKGROUND

The security monitoring and alarm industry is well established in their practices of monitoring buildings in residential, commercial and industrial settings. They use wireline and wireless systems in which a plurality of sensors, cameras and audio monitors communicate over bi-directional links to an alarm panel, which itself communicates to a remote central control station, or monitoring service, via a wireless or wireline channel. The sensors, cameras and audio monitors are deployed in specific regions called zones that they monitor. There may be a one to many relationship between the cameras or audio monitors and the sensors. These sensors come in many varieties, such as motion, vibration, smoke or heat detectors. The wireline link is typically twisted pair copper wire or coaxial cable; the wireless link is in the 800 MHz, 900 MHz or 2.4 GHz range. The alarm panel communicates with a remote central control station using methods such as wireless and cellular links, traditional Plain Old Telephone Service (POTS) over the Public Switched Telephone Network (PSTN).

For both professional and private security systems the exclusive use of wireless networks and PSTN have limitations. In the case of wireless networks the user may be out of range of the serviceable area, but chances are there would still be Internet or PSTN access. Using the PSTN may result in expensive long distance charges if the call placed by the security system is out of the local toll area. Routing the call across the Internet backbone can save significantly on the cost of the call. When the security system notifies a monitoring service, the use of the PSTN for alarm delivery has a significant infrastructure cost associated with it. If the call center for a monitoring service is servicing a large client base, there will be excessive infrastructure cost associated with renting high-speed digital PSTN connections, like T1/E1 or T3/E3. Further costs include a PBX, wiring, BIX wiring cabinet and from time to time restructuring costs. A call center enabled to receive IP communications can significantly reduce this cost by employing IP phones, an Ethernet hub, a single LAN and high-speed Internet connections. As an example, a single 640 kbps DSL or Cable modem connection can theoretically handle up to 10 simultaneous VoIP calls on a single twisted pair wire. In fact, it is common to find DSL and Cable modems that have a down stream data rate of between 6-7 Mbps. This translates into a single modem at a call center handling up to 100 VoIP calls.

In current systems a new alarm panel capable of communication across a broadband connection is required because existing alarm panels have been designed for analog communications. While the saving for the monitoring service in switching to IP is great, the cost of installing new alarm panels at monitored sites is prohibitive.

SUMMARY

Exemplary embodiments include a communications system for an alarm panel including: an alarm panel adaptor in operable communication with the alarm panel generating analog alarm signals; a first powerline communications device in operable communication with a the alarm panel adaptor converting the analog alarm signals to powerline alarm signals; a second powerline communications device receiving the powerline alarm signals over an electrical grid and converting the powerline alarm signals to internet protocol alarm signals; and a broadband connection in operable communication with the second powerline communications device for transmitting the internet protocol alarm signals to a remote central control station.

Exemplary embodiments also include a device for enabling an alarm panel to communicate over a broadband connection including: a first communications port for communicating an analog alarm signal with the alarm panel; a processor in operable communication with the first communications port receiving and relaying the analog alarm signal; a first powerline communications device in operable communication with the processor for converting the analog alarm signal into a powerline alarm signal; and a second communications port communicating the powerline alarm signals over a local electrical grid.

Further exemplary embodiments include a system for enabling an alarm panel for use over a broadband connection including: means for connecting the alarm panel to a first powerline communications device; means for connecting the first powerline communications device to a local electrical grid; means for connecting a second powerline communications device to the broadband adaptor; and means for connecting the second powerline communications device to the local electrical grid wherein the alarm panel is able to communicate with the broadband connection through the local electrical grid.

Other systems, methods, and/or computer program products according to exemplary embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Referring now to the drawings wherein like elements are numbered alike in the several Figures.

DETAILED DESCRIPTION

Figure 1:
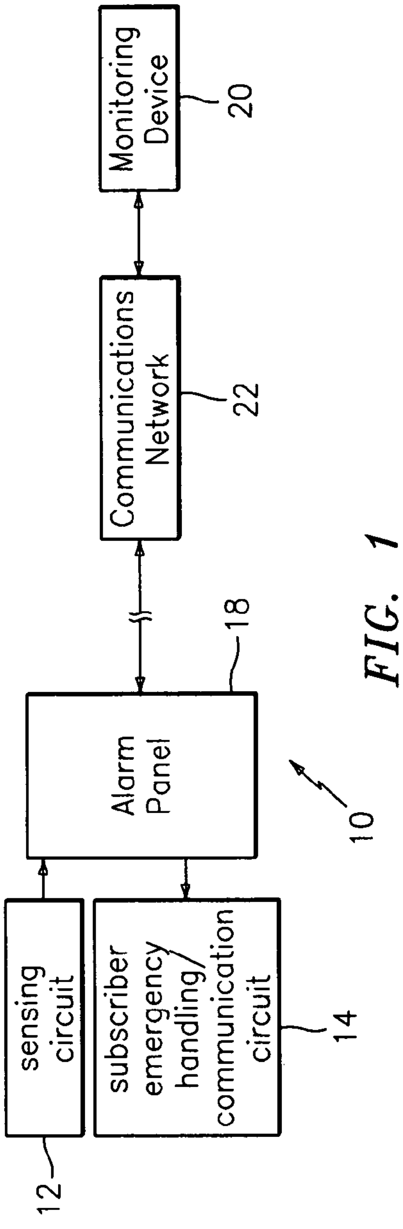
FIG. 1 is a block diagram of a security system in accordance with exemplary embodiments.

Referring now to FIG. 1, a block diagram of a security system in accordance with exemplary embodiments is generally depicted as 10. The security system comprises a sensing circuit 12, a subscriber emergency handling/communication circuit 14, an alarm panel 18, a remote administrating and monitoring device 20, and a communications network 22. The remote administrating and monitoring device 20 is in operable communication with the alarm panel 18 and the communications network 22.

Figure 2:
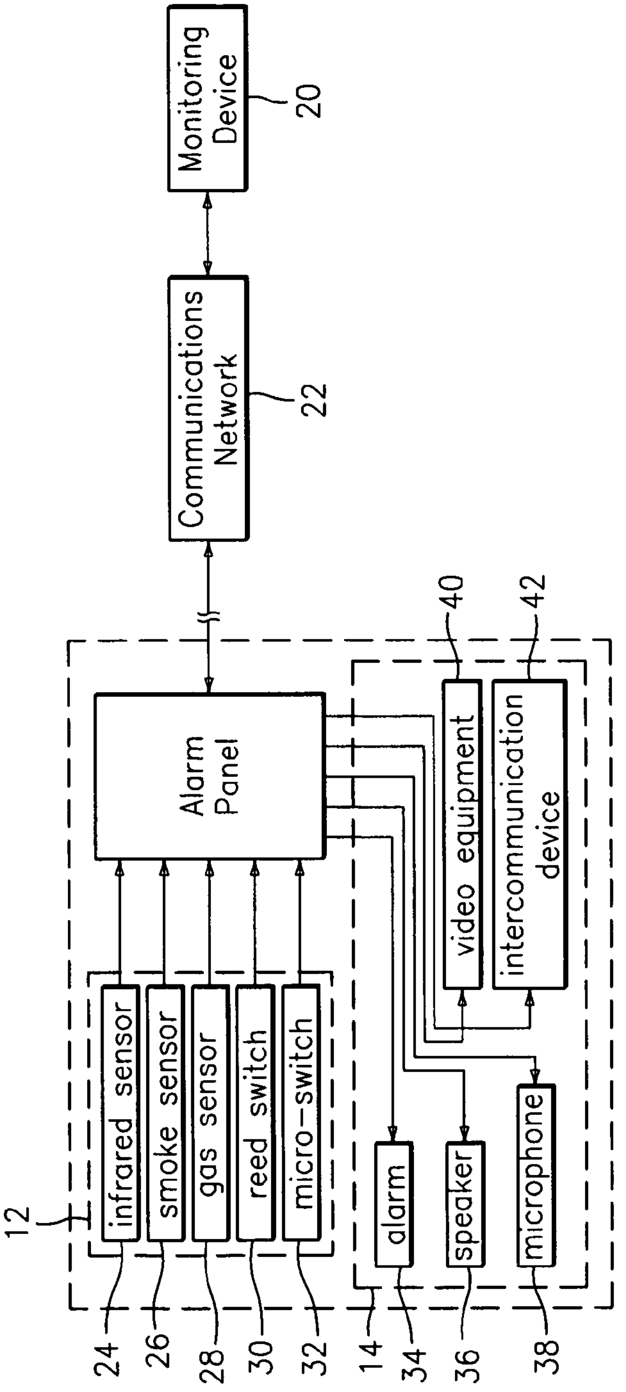
FIG. 2 is a block diagram depicting a security system application in accordance with exemplary embodiments.

Referring to FIG. 2, the sensing circuit 12 includes various types of detecting devices; such as infrared sensors 24, smoke sensors 26, gas sensors 28, reed switches 30, micro switch 32, and the like. As shown in FIG. 2, these detecting devices are installed, for monitoring, at proper locations, for example doors, windows, doorways, and the like, at the client side, in such a manner that the installation and the determination of a proper location are in accordance with the characteristics of individual components. Moreover, any state information detected by aforesaid detecting device can be forwarded to the alarm panel 18.

In case of a preset special incident, the subscriber emergency handling/communication circuit 14 is capable of generating an alarm signal or other responsive action at the client-side, under the control of the alarm panel 18 or the remote administrating and monitoring device 20. For example, the subscriber emergency handling/communication circuit 14 can include an alarm 34, a speaker 36, a microphone 38, video equipment 40, an intercommunication device 42, and the like. When the alarm panel 18 receives a signal from any of the aforesaid detecting devices, it will forward the signal to the remote administrating and monitoring device 20 via the communications network 22.

Figure 3:
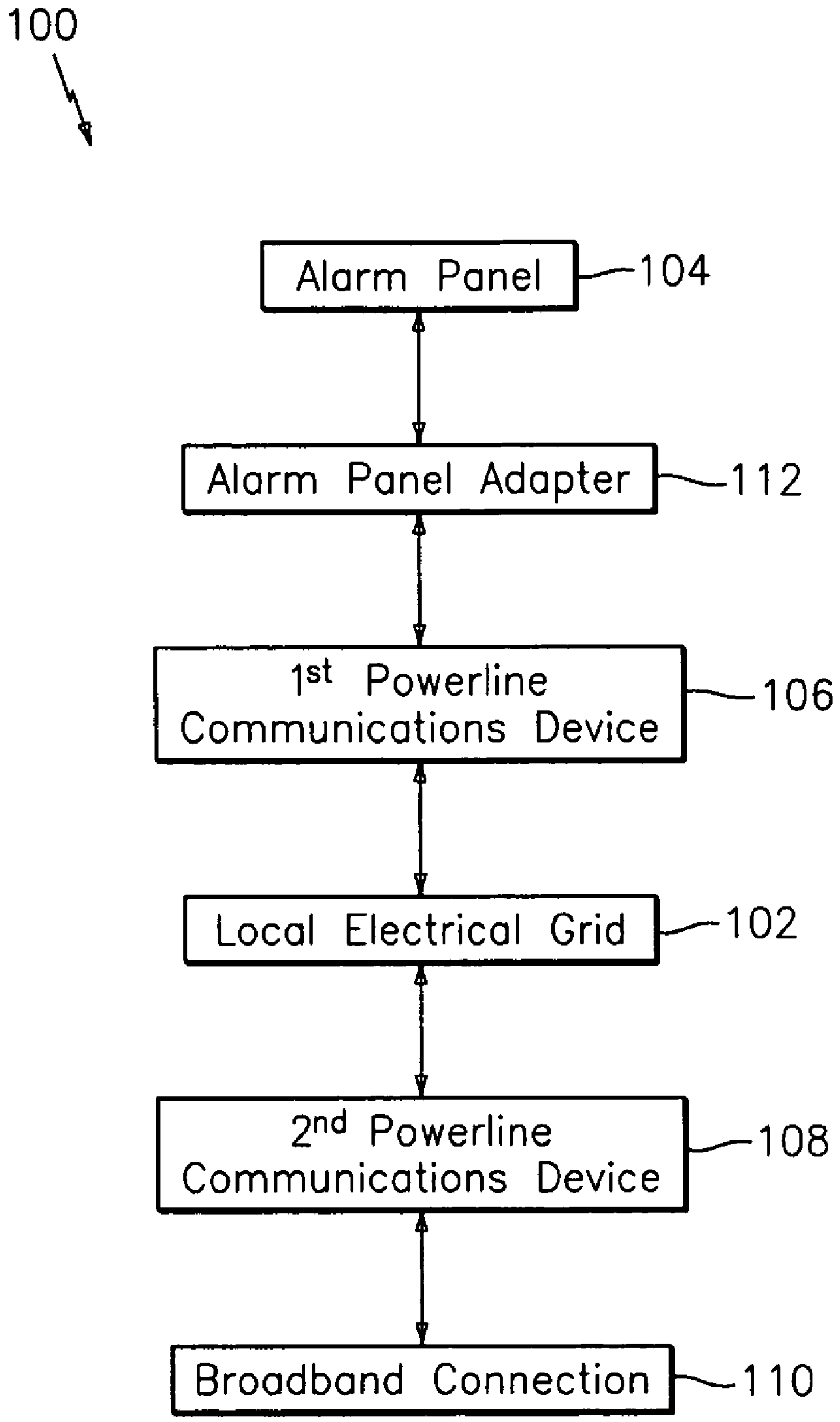
FIG. 3 illustrates a schematic of a system for broadband communication with an alarm panel in accordance with exemplary embodiments.

Referring now to FIG. 3, a schematic of a system for broadband communication with an alarm panel in accordance with exemplary embodiments is generally depicted as 100. The system for broadband communication with an alarm panel includes a local electrical grid 102, an alarm panel 104, a first powerline communications device 106, a second powerline communications device 108, a broadband connection 110, and an alarm panel adaptor 112. The alarm panel adaptor 112 is in operable communication with the alarm panel 104. The first powerline communications device 106 is in operable communication with the alarm panel adaptor 112. The local electrical grid 102 is in operable communication with the first and the second powerline communications devices 106 108. The broadband connection 110 can include, but is not limited to, a DSL connection, a cable modem connection, a T1 connection, a T3 connection, an IEEE 802.11 connection, or an IEEE 802.16 connection. As used herein, the local electrical grid 102 is an electrical grid within a common area (e.g. the electrical wiring for a house or a building).

Continuing with reference to FIG. 3, the broadband connection 110 is in operable communication with the second powerline communications device 108. For example, the broadband connection 110 may be a cable modem or DSL connection located inside the facility being monitored by the alarm system and the second powerline communications device 108 may be connected to the local electrical grid 102 in a close proximity to the broadband connection 110. The alarm panel 104 is connected to the local electrical grid 102 via the first powerline communications device 106. The utilization of the local electrical grid 102 for communication between the alarm panel 104 and the broadband connection 110 allows the alarm panel 104 to be located anywhere in the facility without regard to the location of the broadband connection 110. The only constraint on the location of the alarm panel 104 and the broadband connection 110 is that they must be in close proximity to the local electrical grid 102 which is normally the case because the alarm panel 102 and the broadband connection 110 often require power to operate. Additionally, the local electrical grid 102 provides a secure, reliable, and extensive communications network. The system for broadband communication with an alarm panel allows the alarm panel 104 to communicate with the monitoring service via the broadband connection 110.

In exemplary embodiments the alarm panel 104 is designed to communicate with a remote central control station using methods such as traditional Plain Old Telephone Service (POTS) over the Public Switched Telephone Network (PSTN). The alarm panel adaptor 112 is designed to connect to the alarm panel 104 in the same manner that the alarm panel 104 would connect to the POTS (i.e. a standard telephone jack or similar connection). The alarm panel adaptor 112 converts and relays analog alarm signals that it receives from the alarm panel 104 to the first powerline communications device 106. Additionally, the alarm panel adaptor 104 converts and relays powerline alarm signals that it receives from the first powerline communications device 106 to the alarm panel 104. In exemplary embodiments, the alarm panel adaptor 112 and the first powerline communications device 106 may be implemented in either a single device or as two discrete devices. The fist powerline communications device 106 communicates with the second powerline communications device 108 over the local electrical grid 102. In exemplary embodiments, the local electrical grid 102 can have a voltage ranging from 100 volts (V) to 240 V, depending upon the system.

In exemplary embodiments, the first and second powerline communications devices 106 and 108 are able to establish communication over a powerline network, such as the local electrical grid 102, using an enhanced form of orthogonal frequency-division multiplexing (OFDM) with forward error-correction, similar to the technology found in DSL modems. OFDM is a variation of the frequency-division multiplexing (FDM) used in phone-line networking. FDM puts computer data on separate frequencies from the voice signals being carried by the phone line, separating the extra signal space on a typical phone line into distinct data channels by splitting it into uniform chunks of bandwidth. In the case of OFDM, the available range of frequencies on the electrical subsystem (approximately 4.5 MHz to approximately 21 MHz) is split into 84 separate carriers. OFDM sends packets of data simultaneously along several of the carrier frequencies, allowing for increased speed and reliability In other exemplary embodiments, the first and second powerline communications devices 106 and 108 are able to establish communication over a powerline network, such as the local electrical grid 102, by using frequency-shift keying (FSK) to send data back and forth over the electrical wires in your home. FSK uses two frequencies, one for 1s and the other for 0s, to send digital information between the devices on the network. The frequencies used are in a narrow band just above the level where most line noise occurs. Although this method works, it is somewhat fragile. Anything that impinges on either frequency can disrupt the data flow, causing the transmitting computer to have to resend the data, which can affect the performance of the network.

In exemplary embodiments, the second powerline communications device 108 communicates with the broadband connection 110. The second powerline communications device 108 may convert and/or relay powerline alarm signals received from the first powerline communications device 106 to the broadband connection 110 in the form of internet protocol alarm signals. Likewise, the second powerline communications device 108 may convert and/or relay internet protocol alarm signals received from the broadband connection 110 to the first powerline communicates device 106 through the local electrical grid 102.

Figure 4:
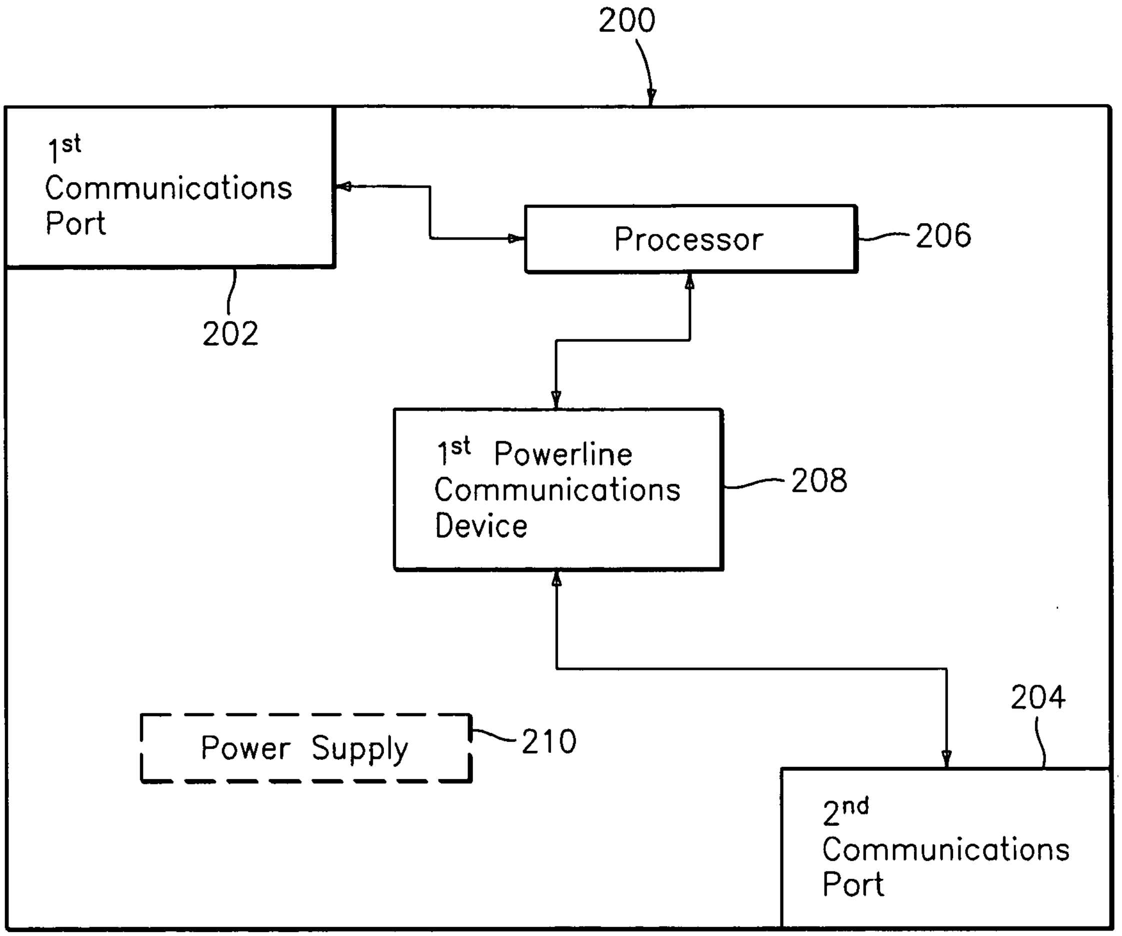
FIG. 4 illustrates a block diagram of an alarm panel adaptor in accordance with exemplary embodiments.

Referring now to FIG. 4, a block diagram of an alarm panel adaptor in accordance with exemplary embodiments is depicted generally as 200. The alarm panel adaptor 200 includes a first communications port 202, a second communications port 204, a processor 206, a first powerline communications device 208, and an optional power supply 210. The first communications port 202 is designed to receive a traditional POTS connection from the alarm panel and can include, but is not limited to, a standard telephone jack (RJ11). The second communications port 204 is designed to connect the alarm adaptor 200 to the local electrical grid and can include one or more connections including, but not limited to, a two prong AC power plug, or a three prong AC power plug. The processor 206 receives, converts, and/or relays communications signals between the first communications port 206 and the first powerline communications device 208. The processor 206 may be any suitable commercially available processor or microprocessor.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

What is claimed is:

1. A communications system for an alarm panel comprising:

an alarm panel adaptor in operable communication with the alarm panel generating analog alarm signals, the analog alarm signals for transmission over a telephone network;

a first powerline communications device in operable communication with a the alarm panel adaptor converting the analog alarm signals to powerline alarm signals;

a second powerline communications device receiving the powerline alarm signals over an electrical grid and converting the powerline alarm signals to internet protocol alarm signals; and a broadband connection in operable communication with the second powerline communications device for transmitting the internet protocol alarm signals to a remote central control station.

2. The system of claim 1, wherein the alarm panel communicates with a remote central control station through the broadband connection.

3. The system of claim 1, wherein the local electrical grid has a voltage of approximately one hundred and twenty volts and has a frequency of approximately sixty hertz.

4. The system of claim 1, wherein the first and the second powerline communication devices utilize an enhanced form of orthogonal frequency-division multiplexing to communicate over the local electrical grid.

5. The system of claim 1, wherein the first and the second powerline communication devices utilize frequency-shift keying to communicate over the local electrical grid.

6. The system of claim 2, wherein the broadband connection is at least one of:

a DSL connection;

a cable modem connection;

a T1 connection;

a T3 connection;

an IEEE 802.11 connection; or an IEEE 802.16 connection.

7. The system of claim 1, wherein the alarm panel adaptor and the first powerline communications device are disposed in a single device.

8. A device for enabling an alarm panel to communicate over a broadband connection comprising:

a first communications port for communicating an analog alarm signal with the alarm panel, the analog alarm signal for transmission over a telephone network;

a processor in operable communication with the first communications port receiving and relaying the analog alarm signal;

a first powerline communications device in operable communication with the processor for converting the analog alarm signal into a powerline alarm signal; and a second communications port communicating the powerline alarm signals over a local electrical grid.

9. The device of claim 8, wherein the powerline alarm signals are an enhanced form of orthogonal frequency-division multiplexing.

10. The device of claim 8, wherein the powerline alarm signals is a frequency-shift keyed signal.

11. The device of claim 8, wherein the first communications port is a standard telephone jack.

12. The device of claim 8, wherein the second communications port is a standard AC power connector.

13. The device of claim 8, wherein the local electrical grid has a voltage of approximately one hundred and twenty volts and has a frequency of approximately sixty hertz.

14. The device of claim 8, wherein the broadband connection is at least one of:

a DSL connection;

a cable modem connection;

a T1 connection;

a T3 connection;

an IEEE 802.11 connection; or an IEEE 802.16 connection.

15. A system for enabling an alarm panel for use over a broadband connection comprising:

means for connecting the alarm panel to a first powerline communications device;

means for converting analog alarm signals for transmission over a telephone network from the alarm panel to powerline alarm signals for transmission on an electrical grid;

means for connecting the first powerline communications device to a local electrical grid;

means for connecting a second powerline communications device to the broadband connection; and means for connecting the second powerline communications device to the local electrical grid wherein the alarm panel is able to communicate with the broadband connection through the local electrical grid.

16. The system of claim 15, wherein the local electrical grid has a voltage of approximately one hundred and twenty volts and has a frequency of approximately sixty hertz.

17. The system of claim 15, wherein the first and the second powerline communication devices utilize an enhanced form of orthogonal frequency-division multiplexing to communicate over the local electrical grid.

18. The system of claim 15, wherein the first and the second powerline communication devices utilize frequency-shift keying to communicate over the local electrical grid.

19. The system of claim 15, wherein the broadband connection is at least one of:

a DSL connection;

a cable modem connection;

a T1 connection;

a T3 connection;

an IEEE 802.11 connection; or an IEEE 802.16 connection.

20. The system of claim 15, wherein the alarm panel adaptor and the first powerline communications device are disposed in a single device.

* * * * *